US007753767B2

(12) United States Patent
Thomas

(10) Patent No.: US 7,753,767 B2
(45) Date of Patent: Jul. 13, 2010

(54) MULTI-HAND CARD GAME METHOD AND APPARATUS

(75) Inventor: Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 281 days.

(21) Appl. No.: 11/374,489

(22) Filed: Mar. 13, 2006

(65) Prior Publication Data

US 2006/0211467 A1 Sep. 21, 2006

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/11; 463/13

(58) Field of Classification Search .................. 463/11, 463/13
See application file for complete search history.

(56) References Cited

U.S. PATENT DOCUMENTS

| | | | | |
|---|---|---|---|---|
| 4,743,022 | A | | 5/1988 | Wood |
| 5,019,973 | A | * | 5/1991 | Wilcox et al. ................. 463/13 |
| 5,277,424 | A | * | 1/1994 | Wilms ......................... 463/12 |
| 5,294,120 | A | | 3/1994 | Schultz |
| 5,308,065 | A | | 5/1994 | Bridgeman et al. |
| 5,322,295 | A | | 6/1994 | Cabot et al. |
| 5,356,140 | A | * | 10/1994 | Dabrowski et al. ............ 463/12 |
| 5,401,023 | A | | 3/1995 | Wood |
| 5,431,408 | A | | 7/1995 | Adams |
| 5,437,451 | A | | 8/1995 | Fulton |
| 5,489,101 | A | | 2/1996 | Moody |
| 5,511,781 | A | | 4/1996 | Wood et al. |
| 5,531,448 | A | | 7/1996 | Moody |
| 5,732,950 | A | | 3/1998 | Moody |
| 5,816,916 | A | | 10/1998 | Moody |
| 5,823,873 | A | | 10/1998 | Moody |
| 5,868,619 | A | | 2/1999 | Wood et al. |

(Continued)

FOREIGN PATENT DOCUMENTS

| | | |
|---|---|---|
| WO | WO 97/27570 | 7/1997 |

OTHER PUBLICATIONS

Draw Poker Variants, web page (6 pages).

*Primary Examiner*—John M Hotaling
*Assistant Examiner*—Kevin Y Kim
(74) *Attorney, Agent, or Firm*—Nixon Peabody LLP

(57) ABSTRACT

A method and apparatus for playing a multi-hand card game is disclosed. The game allows the simultaneous play of multiple card hands that are created from a first card hand. Each subsequent card hand includes cards whose rank is a function of the rank of cards in the immediately preceding card hand (or the first card hand). The generation of the subsequent card hands may be based on all cards in the first card hand, or may be restrictively applied only to the hold cards from the first card hand. The hold cards may include wild cards, which generate additional wild cards for subsequent hands that are a function of the rank of the wild cards in the first card hand. The card game may also make an award for a subsequent card hand that is the greater of an award for a second winning combination in the subsequent hand or the award for a first winning combination in a preceding card hand.

20 Claims, 13 Drawing Sheets

U.S. PATENT DOCUMENTS

| | | | |
|---|---|---|---|
| 5,882,259 | A | 3/1999 | Holmes, Jr. |
| 5,954,335 | A | 9/1999 | Moody |
| 5,957,774 | A | 9/1999 | Holmes, Jr. et al. |
| 5,976,016 | A | 11/1999 | Moody et al. |
| 6,007,066 | A | 12/1999 | Moody |
| 6,012,720 | A | 1/2000 | Webb |
| 6,045,129 | A | 4/2000 | Cooper et al. |
| 6,098,985 | A | 8/2000 | Moody |
| 6,110,040 | A | 8/2000 | Sanduski et al. |
| 6,120,378 | A | 9/2000 | Moody et al. |
| 6,132,311 | A | 10/2000 | Williams |
| 6,149,521 | A | 11/2000 | Sanduski |
| 6,206,780 | B1 | 3/2001 | Awada |
| 6,248,016 | B1 | 6/2001 | Walker et al. |
| 6,257,979 | B1 | 7/2001 | Walker et al. |
| 6,336,860 | B1 | 1/2002 | Webb |
| 6,416,407 | B1 | 7/2002 | Carrico et al. |
| 6,461,240 | B1 | 10/2002 | Perkins |
| 6,471,587 | B1 | 10/2002 | Wood et al. |
| 6,474,645 | B2 | 11/2002 | Tarantino |
| 6,494,454 | B2 | 12/2002 | Adams |
| 6,561,898 | B2 | 5/2003 | Moody |
| 6,569,013 | B1 | 5/2003 | Taylor |
| 6,569,014 | B2 | 5/2003 | Walker et al. |
| 6,595,520 | B1 | 7/2003 | Richards et al. |
| 6,595,852 | B2 | 7/2003 | Wang |
| 6,612,926 | B1 | 9/2003 | Dabrowski |
| 6,612,927 | B1 | 9/2003 | Slomiany et al. |
| 6,616,142 | B2 | 9/2003 | Adams |
| 6,637,747 | B1 | 10/2003 | Garrod |
| 6,672,958 | B2 | 1/2004 | Bennett |
| 6,708,975 | B1 | 3/2004 | Fox et al. |
| 6,726,427 | B2 | 4/2004 | Jarvis et al. |
| 6,780,106 | B2 | 8/2004 | DeMar et al. |
| 6,857,957 | B2 | 2/2005 | Marks et al. |
| 7,007,953 | B1 * | 3/2006 | Cabot ......................... 273/292 |
| 2002/0034974 | A1 | 3/2002 | Wood et al. |
| 2002/0169015 | A1 | 11/2002 | Moody |
| 2002/0185816 | A1 | 12/2002 | Moody et al. |
| 2002/0187823 | A1 * | 12/2002 | Khal ........................... 463/13 |
| 2003/0032469 | A1 | 2/2003 | Moody et al. |
| 2003/0038425 | A1 | 2/2003 | Tarantino |
| 2003/0064773 | A1 | 4/2003 | Baerloucher et al. |
| 2003/0119572 | A1 | 6/2003 | Moody et al. |
| 2003/0153377 | A1 | 8/2003 | Lisowski, Sr. |
| 2003/0166411 | A1 | 9/2003 | Moody |
| 2003/0181232 | A1 | 9/2003 | Peccola, Jr. |
| 2003/0186733 | A1 | 10/2003 | Wolf et al. |
| 2003/0189290 | A1 | 10/2003 | Moody |
| 2003/0214097 | A1 | 11/2003 | Moody |
| 2004/0043807 | A1 | 3/2004 | Pennington |
| 2004/0053676 | A1 * | 3/2004 | Rodgers ...................... 463/20 |
| 2004/0132524 | A1 | 7/2004 | Ramstad et al. |
| 2004/0248641 | A1 | 12/2004 | Jarvis et al. |
| 2006/0178184 | A1 * | 8/2006 | Gomez ........................ 463/13 |

* cited by examiner

| Combination Type | Examples of Winning Symbol Combinations | Credits Awarded |
|---|---|---|
| **Pair Bonus** | Awarded in lieu of current hand symbol combination award if less than the hold or generated cards in any previous hand | 10 |
| Pair – Jacks or Better | J/J<br>Q/Q | 10 |
| **Two Pair bonus** | Awarded in lieu of current hand symbol combination award if less than the hold or generated cards in any previous hand | 20 |
| Two Pair | 2/2/9/9<br>J/J/9/9 | 20 |
| Three Of A Kind | J/J/J<br>5/5/5 | 30 |
| **Straight Bonus** | Awarded in lieu of current hand symbol combination award if less than the hold or generated cards in any previous hand | 40 |
| Straight | 1/2/3/4/5;<br>10/J/Q/K/A | 40 |
| Flush | ♥/♥/♥/♥/♥<br>♣/♣/♣/♣/♣ | 50 |
| Full House | 10/10/K/K/K;<br>2/2/2/9/9 | 75 |
| Four Of A Kind | 10/10/10/10;<br>K/K/K/K | 100 |
| **Straight Flush Bonus** | Awarded in lieu of current hand symbol combination award if less than the hold or generated cards in any previous hand | 150 |
| Straight Flush | 9♥/10♥/J♥/Q♥/K♥ | 150 |
| **Royal Flush Bonus** | Awarded in lieu of current hand symbol combination award if less than the hold or generated cards in any previous hand | 250 |
| Royal Flush | 10♥/J♥/Q♥/K♥/A♥ | 250 |
| Note: A card hand formed from the initial card hand are eligible to receive either a bonus award based on the previous card hand's held or propagated cards or the award for the winning symbol combination represented by the card hand, whichever is higher. | | |

FIG. 12

MULTI-HAND CARD GAME METHOD AND APPARATUS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to gaming machines and, more particularly, to gaming machines having a multi-hand card game.

BACKGROUND OF THE INVENTION

Gaming machines, such as slot machines and video poker machines are integral to the success of the gaming industry. Video poker machines have been particularly popular with players. A variety of video poker games have been developed to appeal to a broad spectrum of players. The best video poker games are extremely successful and remain successful year after year. There is a continuing need for gaming machine manufacturers to produce new types of card games for video gaming machines to continue to satisfy consumer demand for new and more entertaining games.

One concept that has been successfully employed to enhance the entertainment value of video poker games is to allow simultaneous play of multiple card hands. One genre of this game mechanic allows a player to propagate selected cards from a base hand through the remaining simultaneously played card hands. Ostensibly, this game play mechanic gets a player and advantage by allowing him to select his most promising cards and propagate these cards into other hands to increase the player's probability of winning.

As with all forms of entertainment, players look for new and more entertaining games. What is needed is a new type of poker game that propagates an advantage in an initial base card hand into a number of simultaneous played poker hands using a new and more interesting method.

SUMMARY OF THE INVENTION

The present invention is directed to a gaming machine (such as a video gaming machine) having an improved game play mechanic to enhance the entertainment value of a multi-hand card games such as poker; i.e., those games that allow the simultaneous play of multiple card hands. Typically, these types of card games allow the player to select and hold a number of cards from the base card hand; discarding those cards the player does not wish to keep. Each of these hold cards is propagated into the remaining hands. In other card games, the propagated cards in each succeeding hand are the next higher rank than the card in the previous card hand. The non-held cards are discarded and replaced with drawn cards. These drawn cards in the first card hand may also be propagated into each succeeding hand; either as identical cards or using some progression in rank.

To further enhance the entertainment value of these propagating card games, certain bonus features may be incorporated into the pay table to compensate players for the uneven distribution of awards associated with winning card hands that can potentially occur in card games that use escalating rank to build subsequent card hands. For example, in multiple hand card games that do not have escalating ranks, a royal flush in the base card hand propagates as a royal flush to all the subsequent card hands. In contrast, in a multiple hand card game with escalating ranks, the royal flush does not propagate through the subsequent card hands. This causes many players to feel insufficiently rewarded for the royal flush. To prevent this occurrence, and to allow the escalating rank card games to compete effectively with more traditional multiple hand card games, pay tables for these types of games can be revised to include special bonusing payoffs when specified winning symbol combinations are created in any of the card hands in a multiple card and game.

Another feature to enhance multiple hand card games, and especially escalating rank multiple hand card games, uses a wild card bonus feature to increase the impact of a wild card. This wild card bonus feature specifies a specific wild card for each of the card hands. This wild card escalates in rank for each subsequent card hand. Using this technique, a player that acquires a wild card in the first card hand is assured that that wild card will propagate to the remaining subsequent card hands, thereby increasing the impact of the wild card.

Either or both of these features, the wild card propagation game play mechanic or the special bonus pay table, can be incorporated into these multiple hand card games. These features allow escalating rank multiple hand card games to more effectively compete with their more traditional counterparts.

BRIEF DESCRIPTION OF THE DRAWINGS

The foregoing and other advantages of the invention will become apparent upon reading the following detailed description and upon reference to the drawings.

FIG. 12 is a pay table for a poker game that includes special bonus payouts to compensate for card hands that decrease in value because of escalating rank.

Figure 1:
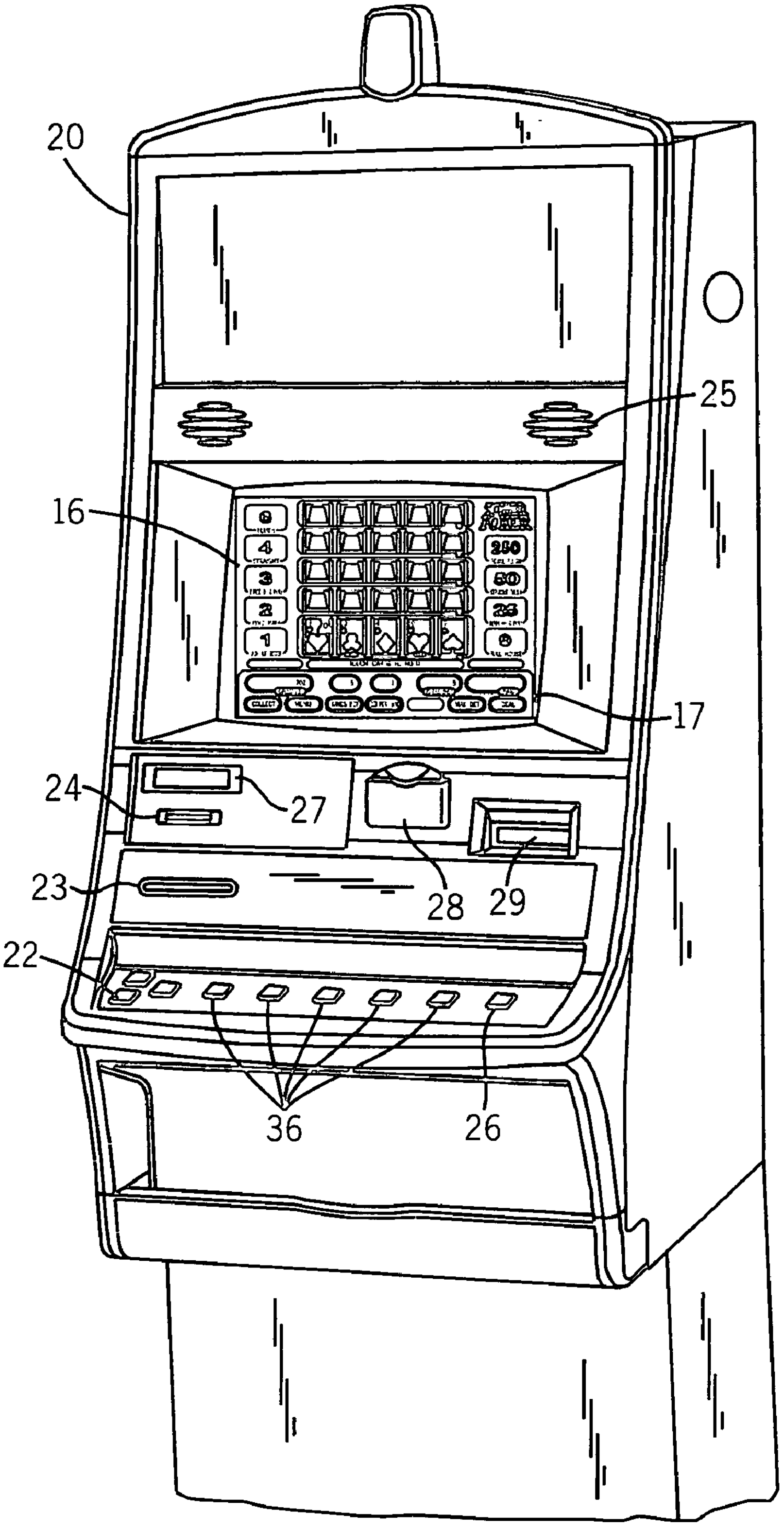
FIG. 1 is a perspective view of a video gaming machine.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning to FIG. 1, a video type gaming machine 20 is shown. The video gaming machine 20 of FIG. 1 uses a video display 16 to display the game outcome. The video display 16 may use a CRT, LED, LCD, or generally any other type of video display. The video display 16 may also include a touch screen 17 to allow players to make game selections.

In the illustrated embodiment shown in FIG. 1, the gaming machine 20 is an "upright" version in which the video display 16 is oriented vertically relative to the player. It will be appreciated, however, that any of several other models of gaming machines are within the scope of the present invention, including, for example, a "slant-top" video gaming machine in which the video display 16 is slanted at about a 30° angle toward the player.

Figure 2:
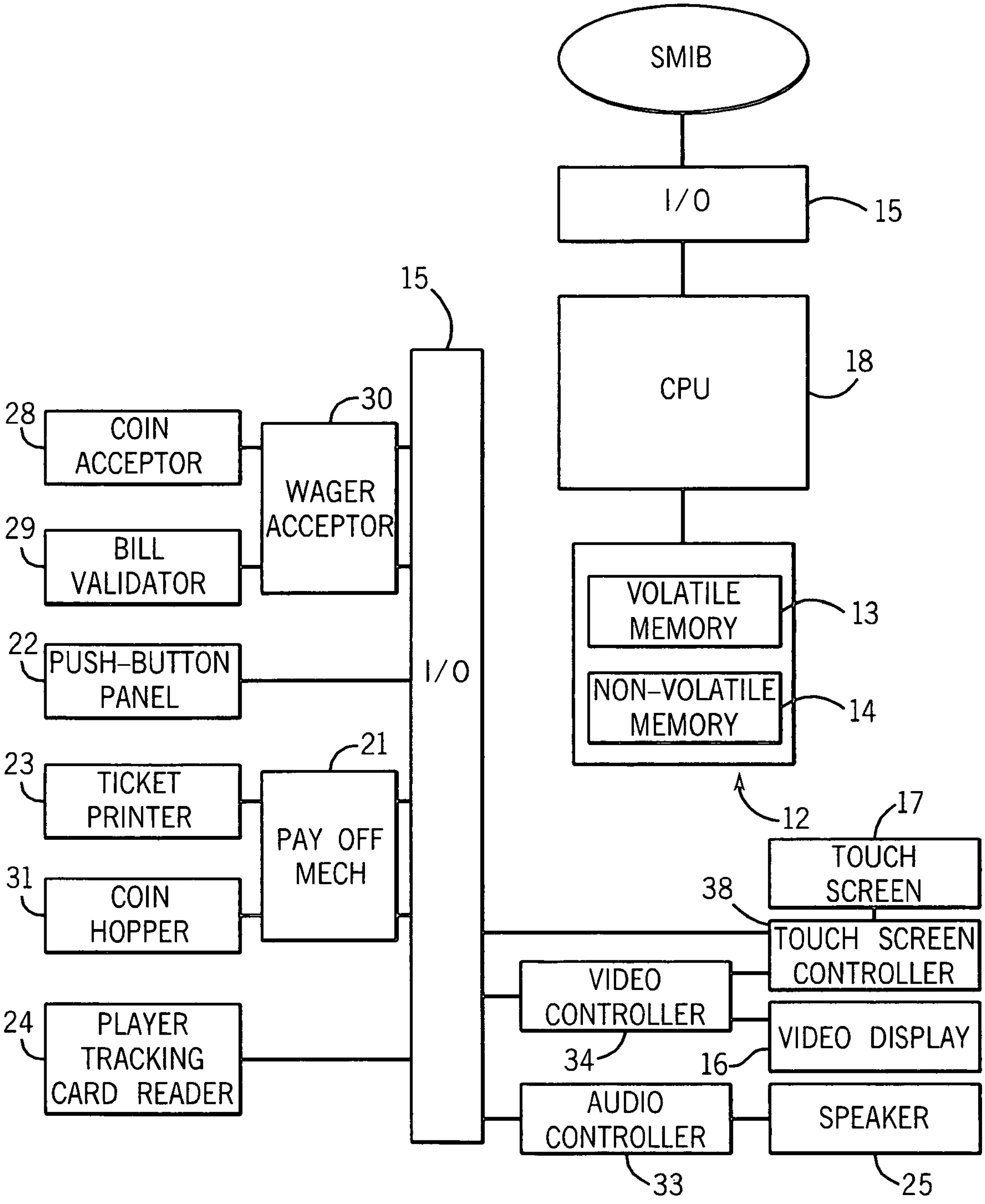
FIG. 2 is a block diagram of a control system suitable for operating the video gaming machine of FIG. 1.

Turning to FIG. 2, a block diagram of a control system suitable for operating the gaming machine of FIG. 1 is shown. A CPU 18 controls the gaming machine 20 through an I/O bus 15 that communicates with a variety of peripheral devices used in the gaming machine 20. These peripheral devices include: a coin acceptor 28, touch screen controller 38, speakers 25, and bill validator 29, etc. For example, a wager acceptor 30 (such as a coin acceptor 28 or a bill validator 29) accepts a wager from a player. The coin acceptor 28 or bill validator 29 signals CPU 18 when bills or coins are inserted into the gaming machine 20.

The CPU 18 could also be part of a central server in communication over a computer network with the gaming machine 20. The central server could determine the game outcomes for display on the gaming machine 20. The gaming machine 20 may still have a CPU to control and communicate with the gaming machines peripheral devices.

Besides inserting a wager, the player may also insert a player-tracking card in the player-tracking card reader 24 to identify the player to the computer network controlling the gaming system. The player-tracking display 27 allows the player-tracking system to communicate with the player.

The CPU 18 executes a game program that causes the video display 16 to display the card game. The player may select the number of simultaneous card hands to play using the hands bet icon 53 and the wager amount using the bet per hand icon 54 via the touch screen 17 or push-button panel 22.

The game commences in response to the player placing a wager and activating the game through the push-button panel 22 or the touch screen 17, causing the CPU 18 to initiate the card game. The CPU 18 randomly draws a card hand using a random number generator (RNG). Typically, video poker gaming machines have a hold push-button 36 on the push-button panel 22 to hold specific cards in a card hand. The player may also use the touch screen 17. These hold cards 46 remain in the player's hand after the player hits the deal/draw icon 52 on the touch screen display 17 or the deal/draw button 26 on the push-button panel 22. After the deal/draw button 26 or icon 52 has been activated, the non-held cards are discarded and drawn cards 47 are inserted into the player's hand.

The programming necessary for the gaming machine 20 to execute game functions is stored in system memory 12. This stored program is operable in association with the CPU 18 to execute the program's instructions on the gaming machine's various peripheral devices including the video display 16, coin acceptor 28, bill validator 29, and push-button panel 22. The system memory 12 stores control software, operational instructions, and data. In one embodiment, the system memory 12 comprises a non-volatile (separate read-only memory (ROM)) 14 and volatile (random access memory (RAM)) 13. The system memory 12 may be implemented on any of several alternative types of memory structures or may be implemented on a single memory structure.

A payoff mechanism 21 is operable in response to instructions from the CPU 18 to award a payoff of credits to the player in response to certain winning outcomes that may occur in the game. Cash from a coin hopper 31 or a cashless ticket from a ticket printer 23 may be dispensed to provide a payoff to the player for a winning combination.

Figure 3:
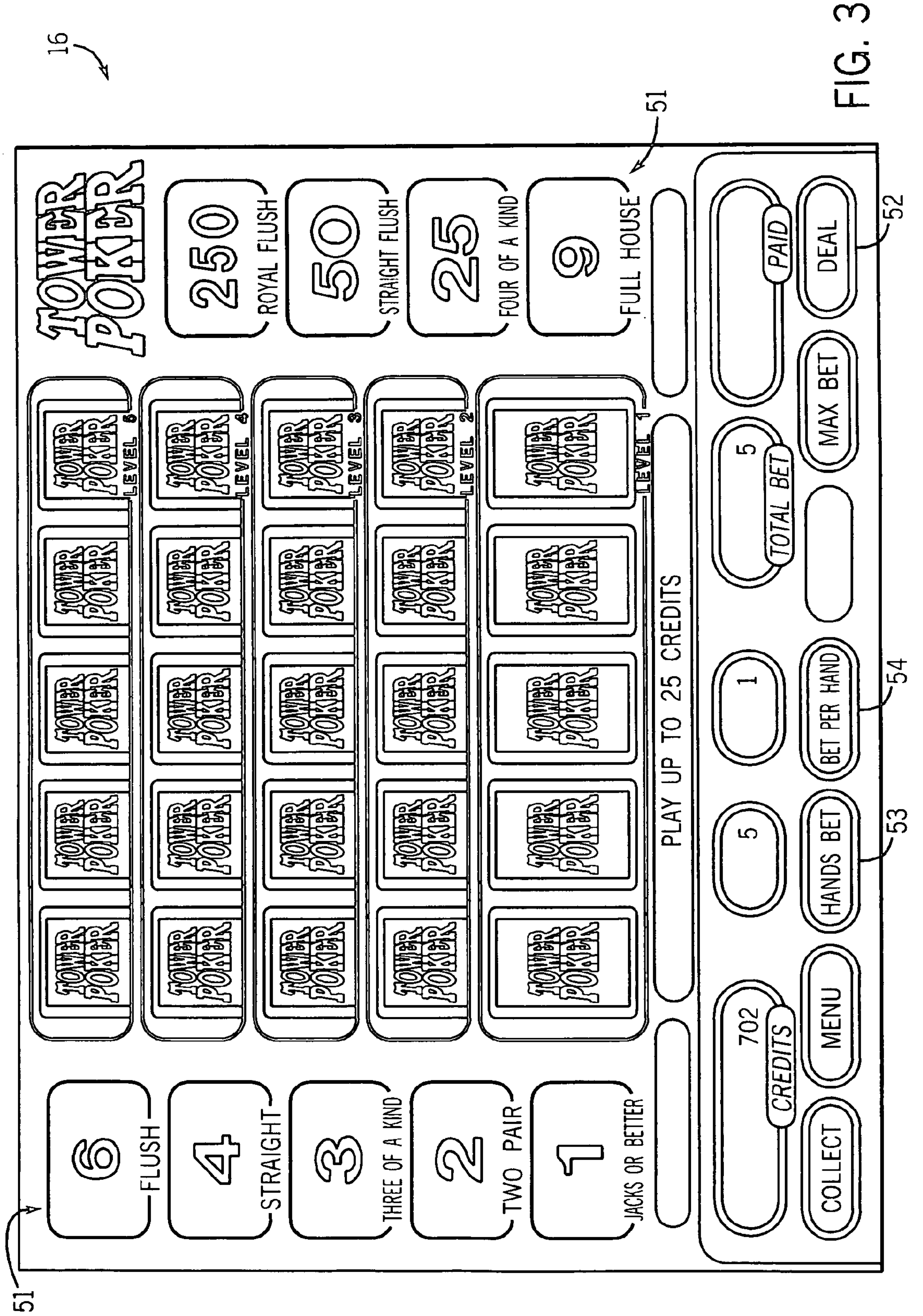
FIG. 3 is a screen display of the initial game with five card hands in play.

The payoff amounts correspond to specific winning combinations available in the card game and are listed in a pay table 51 and stored in system memory 12. FIG. 3 displays the pay table 51 around the periphery of the video display 16. For example, in the popular card game of poker, typical winning combinations include a pair (or a pair of at least Jacks or higher rank), two pairs, three of the kind, full house, four of a kind, flush, straight flush, and royal flush. Other additionally winning combinations could also be specified.

Gaming machines 20 also typically include speakers 25 as illustrated in FIG. 1. These speakers 25 broadcast the game's audio output to the player. The audio output may include messages related to game play or background music to accompany game play. The speaker output is controlled by CPU 18 using a digital signal processor (DSP) to process audio data. The CPU 18 may also include memory for storing the audio data (typically called a data set) that the DSP processes. System memory 12 may also be used to store audio data sets. The processed audio data set is converted to analog audio signals that are amplified external to the main control board by an audio controller 33 and transmitted to the speakers 25 to provide audio output. Alternately, the audio controller 33 may contain the major audio components typically included in the CPU 18.

In a similar manner, video sequences used to display game outcomes may be stored in system memory 12. The CPU 18 retrieves the video sequence corresponding to the game outcome selected by the RNG. The video sequence comprises a video data set ported to the video controller 34 to produce a video image on the video display 16. Any type of audio and video control systems such as though as described above, and any number of variants may be used to implement the present invention.

The above-described video gaming machine 20 may be used to implement the game play mechanics of the multi-hand card game described below either with or without player participation. Turning to FIG. 3, the video display 16 shows a card game with an initial wager sufficient to simultaneously play five different card hands. The wager amount in one embodiment determines the number of simultaneously played poker hands. In this example, the player may play two to five card hands concurrently or simultaneously—although the game could be played using more than five simultaneously played card hands. The gaming machine 20 may allow different wagers or the same wagers to be placed on each of the different card hands. On the periphery of the screen display is a pay table 51 for winning combinations as represented by the cards in each of the card hands.

Figure 4:
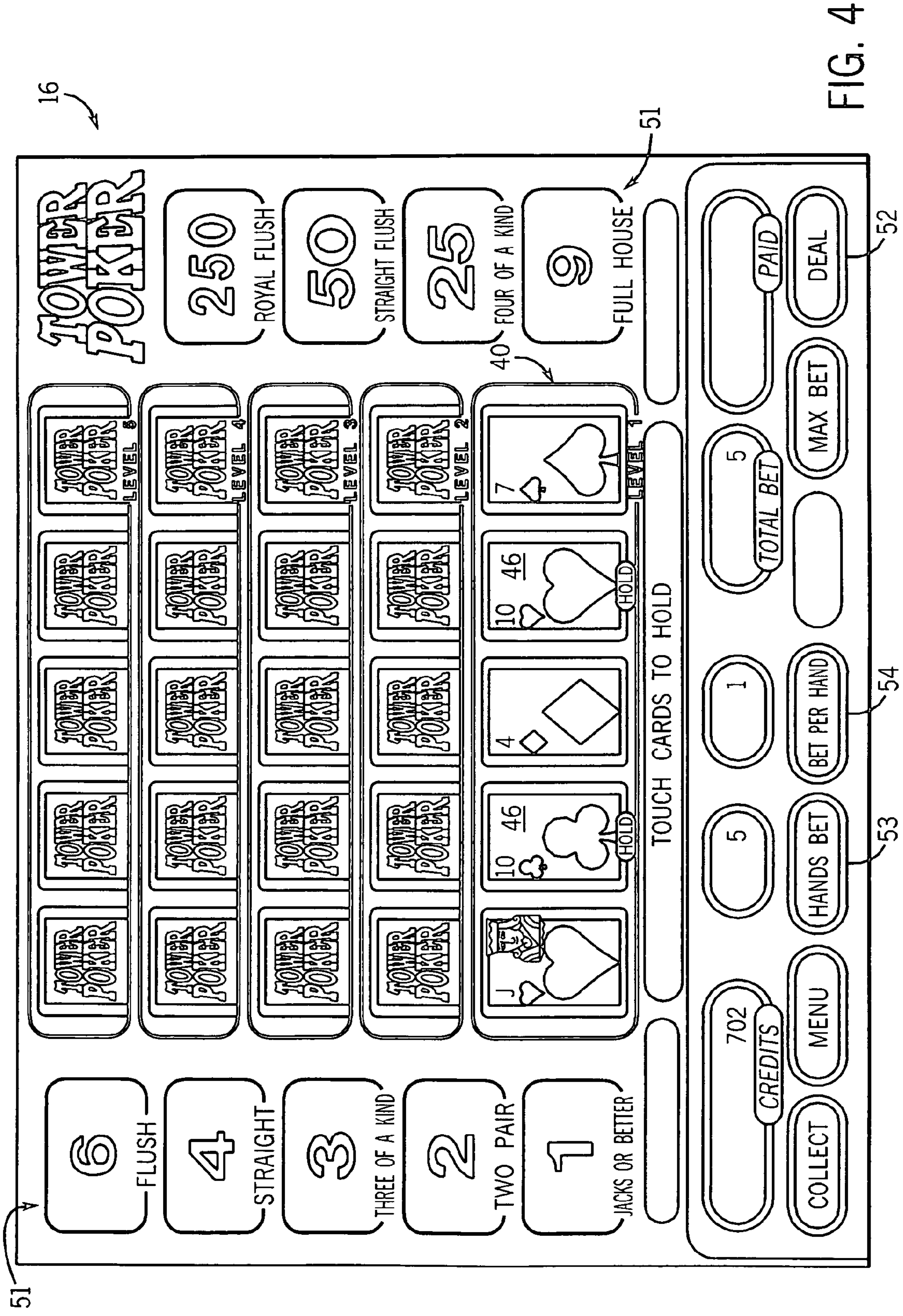
FIG. 4 is a screen display of the initial card set randomly selected by the gaming machine.

The card game is initiated with the player receiving an initial set, or first hand of cards (or card set) 40 as shown in FIG. 4. The initial card set is randomly selected from a group of cards. This group of cards may be a standard card deck or any deck that has escalating ranks or any other hierarchical organization.

In at least one embodiment, the number of cards in the initial card set 40 equals the number of cards required for the game's card hand. For example, in a standard five-card poker game, the initial card set 40 may contain five cards. The initial card set, however, could also contain six, seven, or more cards. This initial card set 40 is reduced to the required number of cards (five for a five-card poker game) through the subsequent hold, discard, and replacement process to produce a five-card hand. Similarly, the initial card set 40 for a three-card poker game may be three cards or a greater number of cards than required for the card hand. Any additional cards beyond the required number of cards simply give the player greater flexibility and a greater likelihood of producing a winning game hand.

Figure 5:
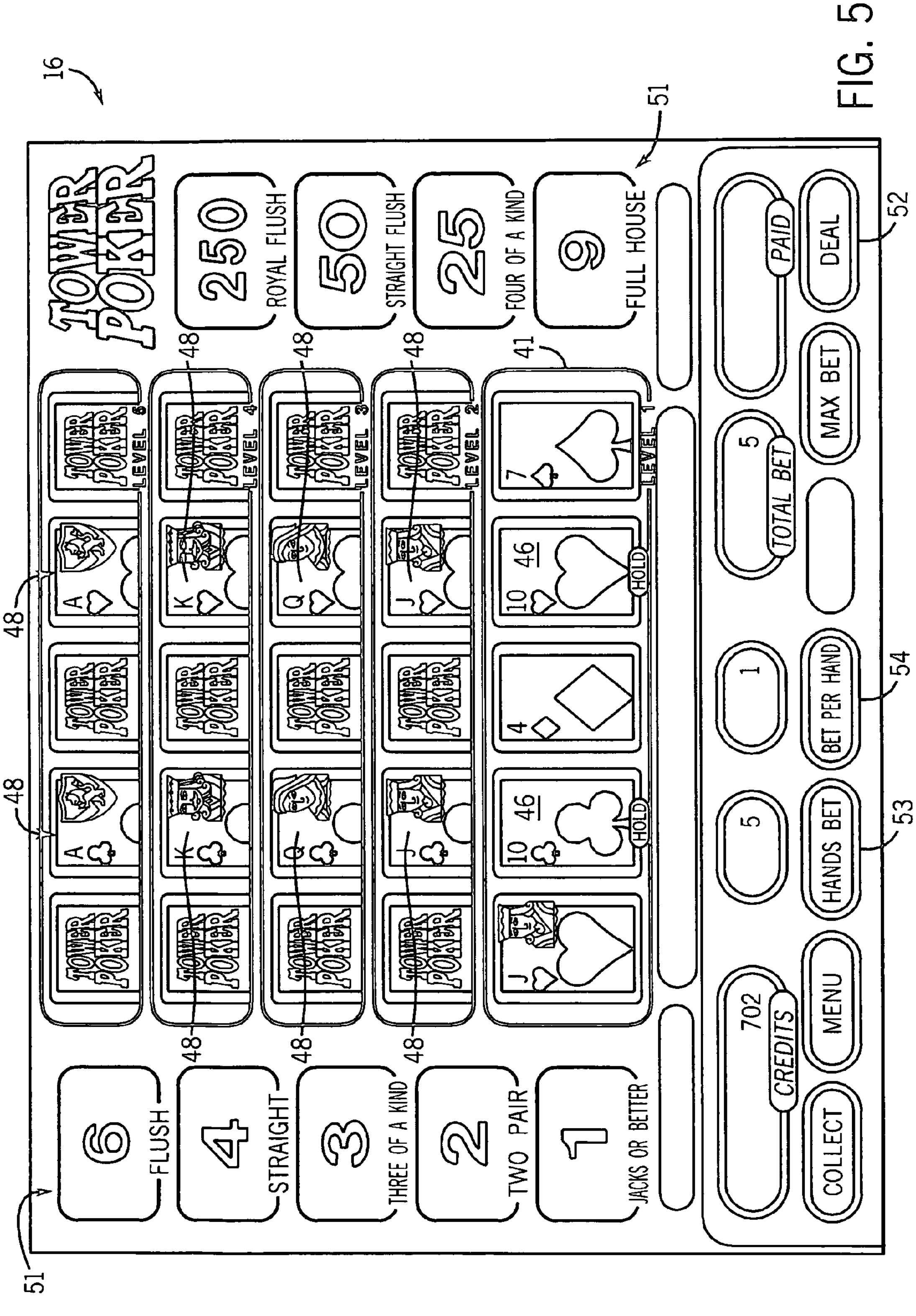
FIG. 5 is a screen display of the player selected hold cards.

The player examines the initial card set 40 and selects hold cards 46 for inclusion in the first card hand 41 (See FIG. 5). The number of cards that the player may hold may be predetermined, randomly determined, or may be any number up to a maximum limit. For example, in a five-card poker game, any number of cards may be held; for example, all five cards may be held, all five discarded, or any number in between may be held. Alternately, the maximum number of cards that can be held may be less than all of the cards in the card hand. For example, the player may only hold up to three cards. The player may customize the game to set the maximum number of held cards with the gaming machine 20 selecting an appropriate pay table 51. The player may also decide, in one embodiment, not to hold any of the cards from the initial card set.

Alternatively, the gaming machine 20 may not require any player participation, and may use an auto-hold feature that selects for the player the most probable winning game outcome. The player may also customize the strategy for playing the game and further customize the auto-hold feature by specifying how much risk and volatility the player wishes to experience—not necessarily producing the greatest likelihood of a winning game outcome but the game play strategy that is most likely to produce the highest payback.

FIG. 4 is a screen display of the selected cards held by the player—in this example, the 10 of clubs and the 10 of hearts. These hold cards 46 are designated as such with the "hold" icon located below each held card. The two hold cards 46 in the first card hand 41 are the basis for developing each of the subsequent card hands. Each subsequent card hand builds from the immediately preceding card hand, escalating the rank of each card in the preceding card hand to form the subsequent card hand.

As can be seen from FIG. 5, the first hold card 46 (the 10 of clubs in the first level) escalates in rank to a jack of clubs in the second level, to a queen of clubs in the third level, to a king of clubs in the fourth level, and the ace of clubs in the fifth level. Similarly, the other hold card 46 (10 of hearts in the first level) escalates in rank to a jack of hearts in the second level, to a queen of hearts in the third level, to a king of hearts in the fourth level, and to the ace of hearts in the fifth level. Each of the cards dependent on the hold cards 46 in the first card hand 41 are generated cards 48 in the subsequent card hands.

Figure 6:
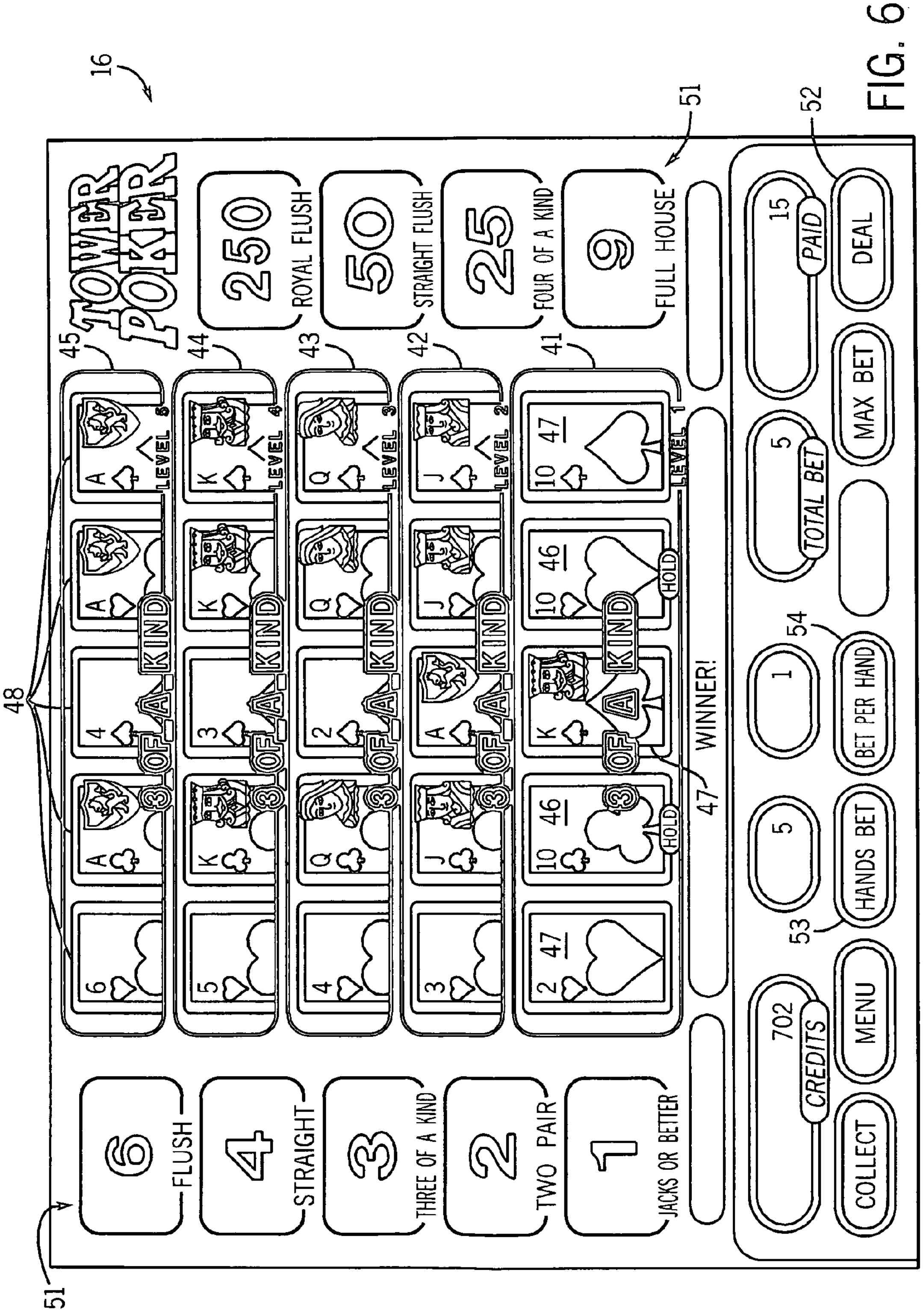
FIG. 6 is a screen display of a first card hand formed with the hold cards of FIG. 5 and the drawn cards to replace the non-held cards of FIG. 5 propagated through each card hand.

As shown in FIG. 6, the player's selected cards are held, all other cards are discarded, and sufficient additional cards are dealt such that the hold cards 46 and the drawn cards 47 produce a game outcome, or modified first card hand 41. This process is shown in FIG. 6, wherein the non-held cards of FIG. 5 (jack of hearts, 4 of diamonds, and 7 of spades) have been discarded and replaced with the 2 of hearts, the king of spades, and a 10 of spades. Each of these randomly selected drawn cards 47 provides the basis for completing the remaining card hands using the same propagating mechanic as described above for the held cards (i.e., using a sequentially higher rank of the same suit than each card in the preceding card hand to form the subsequent card hand).

For example, the second poker hand 42 is formed from the first card hand 41 using the next higher rank of the same suit than each card in the first card hand to create the second card hand. In another embodiment, the suit of each card need not be the same. For example, the suit for each subsequent hand may be randomly determined. Alternately, the suits of the held cards are replicated and the suits of the drawn cards 47 are randomly determined in each of the subsequent hands. The third poker hand 43 (and each additional card hand formed thereafter) builds on the immediately adjacent or preceding card hand in the same manner. In the third card hand 43, the second card hand 42 is used to create the third card hand by using the next higher rank of the same suit than the second card hand to populate the third card hand.

Each card hand is individually evaluated to determine if a winning combination has been formed. As can be seen in FIG. 6, in each of the card games the player has won three of a kind because of the sequentially escalating card rank propagation. The player is awarded for each of the five card hands played according to a three of a kind pay table award.

Figure 7:
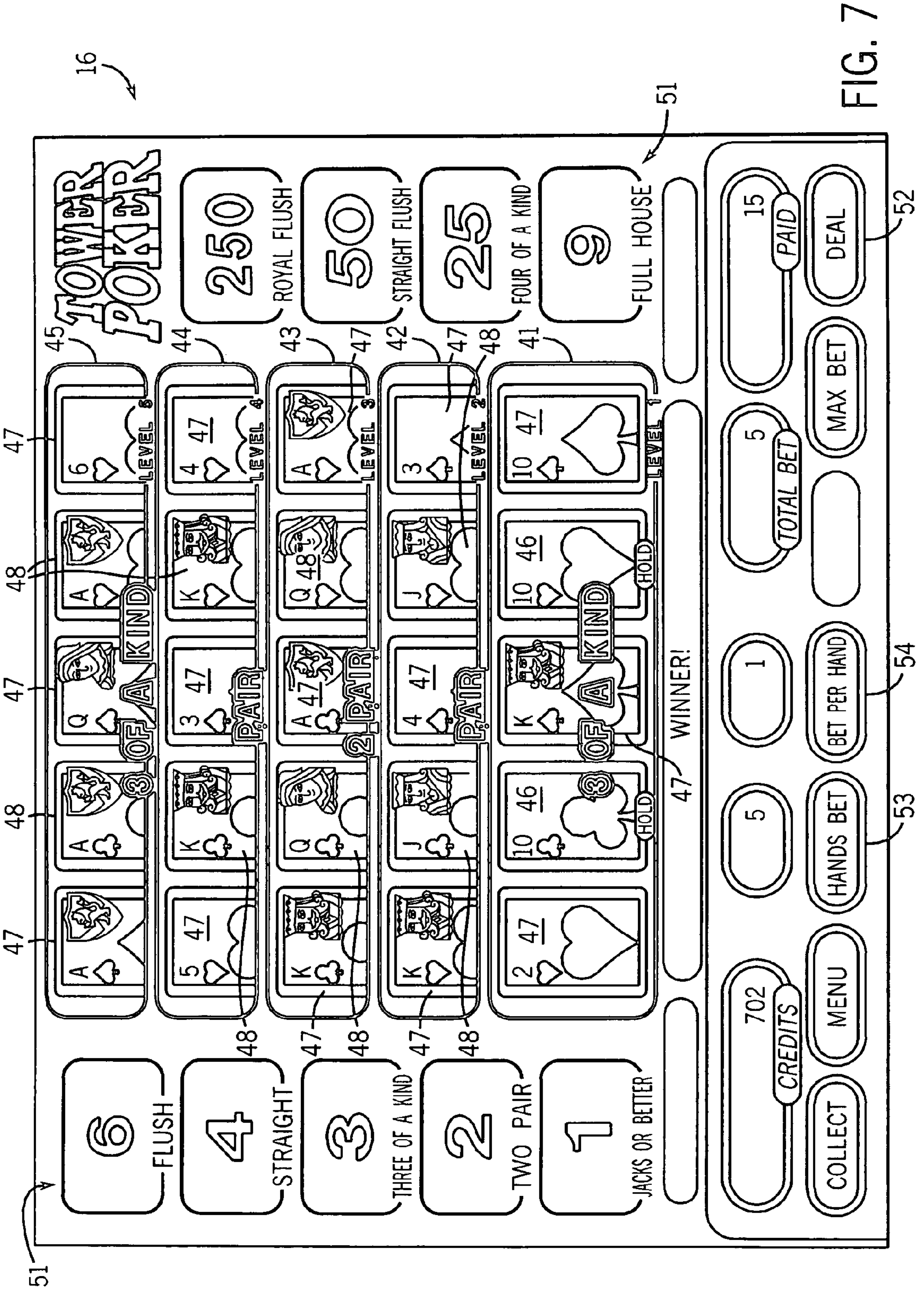
FIG. 7 is a screen display of an alternate game embodiment in which only the hold cards of the first card hand are propagated into the remaining card hands.

In another embodiment, only the hold cards 46 from the first card hand 41 are "towered" in escalating rank into the subsequent hands (i.e., generated cards 48). This is shown in FIG. 7. The remaining cards necessary to create a card hand are randomly selected from a group of cards for each card hand. This group of cards, in one embodiment, does not contain the generated cards 48 (sequentially higher ranks of the hold cards 46) contained in the card hand to be filled. For example, as can be seen from FIG. 7, the hold cards 46 are the 10 of clubs and the 10 of hearts. Only the hold cards 46 are propagated into the remaining hands with sequentially increasing rank. The drawn cards 47 (including the 10 of spades, the king of spades and the 2 of hearts) in the first card hand 41 are not "towered" into the remaining card hands. Rather, the remaining card hands are filled with sufficient additional cards (drawn cards 47) to complete a card hand comprising drawn cards 47 and generated cards 48.

The game play can be accompanied with audio and visual animations to create further interest in the game. For example, cards can be unveiled to players in a manner that creates anticipation. One example of this animation technique is to revolve a card that is to be displayed allowing the base and the back of the card to be intermittently shown to the player. As a card revolves the face of the card and may be altered until the card stops. This creates interest and anticipation. The speed of the card made the gradually slowed to give an indication to the player when the card will stop. Slowing the card also enables the player to more clearly see the card's face value change as the card revolves.

Although all the examples provided in the figures show a sequentially increasing rank occurring in each successive card hand, if an ace occurs in a lower card hand, because the ace is of the highest rank, the subsequent hand includes a deuce (i.e., 2), which is of the lowest rank—with subsequent card hands increasing in rank as described above. Hence, the progression of ranks occurs in a wrap around fashion to form a continuous loop. In some games, the low card is the ace. With the understanding that the card ranks may be cycled in the form a continuous loop, the ranking of each card is determined by adjacent cards in the loop. However the deck of cards includes a highest rank and a lowest rank, which in an embodiment, are Ace and Deuce, respectively. This absolute ranking, however, may affect the pay tables and the value of winning card combinations.

Because of the looping nature of the hierarchical structure, a card of lesser rank could also be the propagated card 48. Any arithmetical or geometric progression (or progression indicating both arithmetic and geometric progressions) is applicable to the propagation of cards to the simultaneously played card games. For example, the propagated card 48 may escalate by two ranks from the preceding card hand. Alternately, the progression could be to a lesser rank or value in each subsequent card hand. Furthermore, different arithmetic or geometric progression functions may be used to develop the propagated cards 48 for the second card hand 42 from each card held in the first card hand 41.

A wild card bonusing feature is also provided for these types of multiple hand card games. Each individual level of the card game may have a designated wild card. For example, in the case of multilevel duplicated card games, a wild card in the first card hand could be duplicated into each of the subsequent card hands. Alternately, or in addition, each card hand could have a designated card rank that becomes wild when drawn or duplicated into the card hand. In this way, each hand of the multi-hand card game is designated its own unique wild card such that no two hands utilize a wild card of the same rank.

This wild card bonus feature can also be adapted to multilevel towered card games. For example, a deuce may be designated as a wild card in this game. To provide a greater impact on the potential outcome of the game and in harmony with the escalating rank feature, the wild card designated for each hand escalates in value for each of the subsequent card hands. For example, if a deuce is a wild card in the first card hand 41, a three is wild in the second card hand 42, a four is wild in the third card hand 43, a five is wild in the fourth card hand 44, and a six is wild in the fifth card hand 45. Should a player acquire a deuce in the first card hand, the player is assured a wild card in each of the subsequent card hands. This game play mechanic is shown in FIG. 8.

Figure 8:
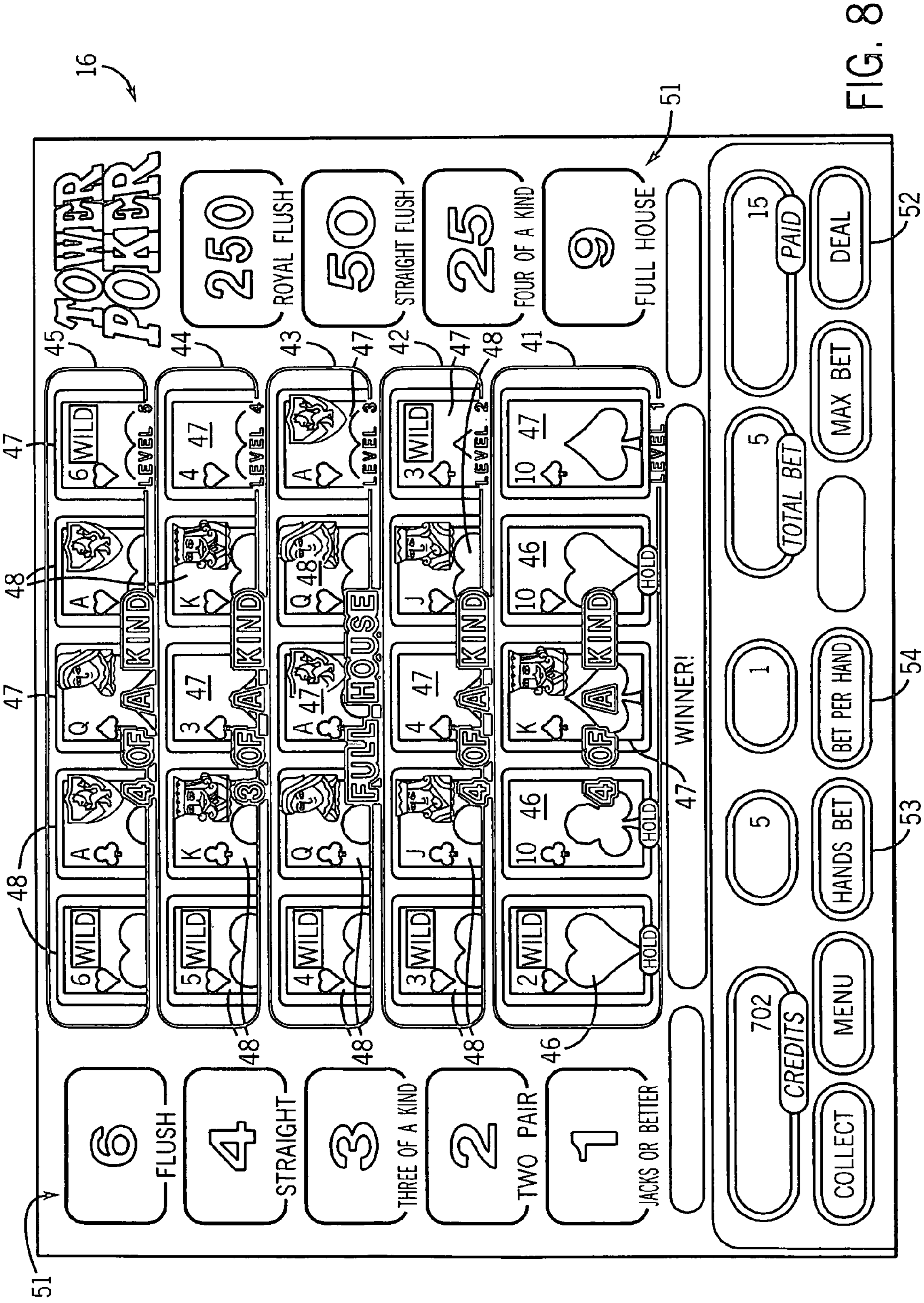
FIG. 8 is a screen display of the alternate game embodiment of FIG. 7 in which a single wild card is propagated into the remaining card hands.

In FIG. 8, a deuce appears in the first card hand 41. The player, by holding this deuce, propagates the initial wild card to each of the subsequent card hands. As can be seen from the FIG. 8, by holding the two of hearts in the first card hand 41, a three of hearts is propagated into the second card hand 42, a four of hearts is propagated into the third card hand 43, a five of hearts is propagated into the fourth card hand 44, and a six of hearts is propagated into the fifth card and 45. In this particular game, each of the escalating card hands has a designated wild card. In this case, the rank of the wild card increases with each card hand (similar to the towering concept of the card game). Because each of these card hands has an escalating wild card rank starting with the deuce in the first card hand 41, each of the propagated cards emanating from the two of hearts is wild in each subsequent card hands as shown in FIG. 8.

In addition to the propagation of wild cards into subsequent card hands by the escalating rank feature of the game, wild cards may also be drawn into card hands. For example, in the second card hand 42 of FIG. 8, the three of spades has been drawn to complete the card hand. This three of spades becomes wild, as the second card hand has been designated wild for all cards having a rank of three. Although, the deuce has been designated as wild in the first card hand, any card may be designated wild and escalate in rank for each subsequent card hand.

One embodiment uses wild cards in a novel game play mechanic. Traditionally, a wild card may represent a single card necessary to obtain a single winning card hand. In the traditional game play mechanic, this representation corresponds to the highest possible award. In a novel game play mechanic, the wild card may represent any number of different cards, of any rank, suit, or rank and suit that can complete a winning symbol combination. Each different winning card combination resulting from the multiple wild card representations are paid in accordance with the pay table.

Figure 9A:
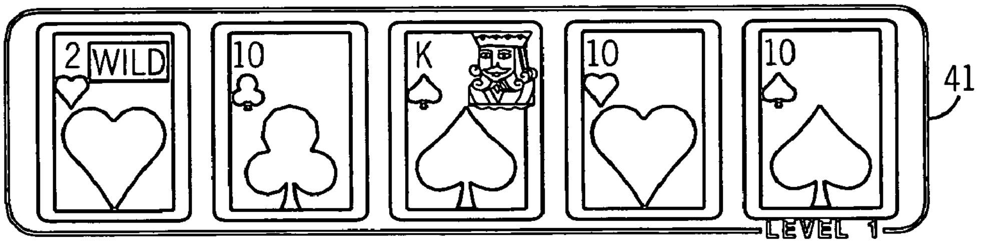
FIGS. 9*a-d* are illustrations of the use of a wild card in multiple winning symbol combinations.
Figure 9B:
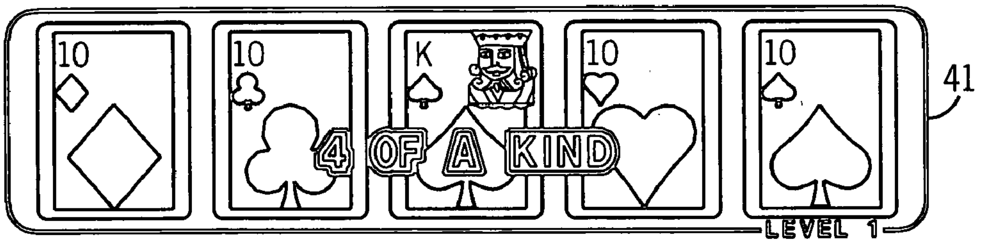
Figure 9C:
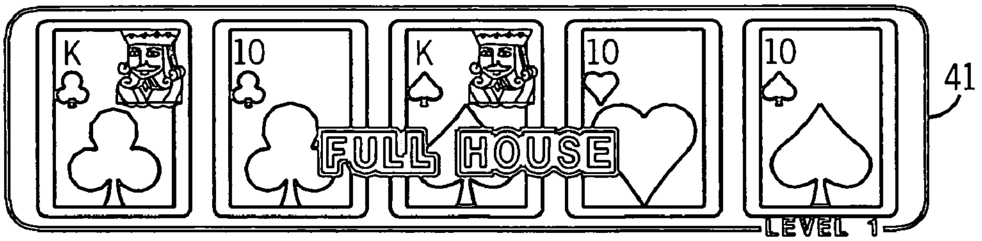
Figure 9D:
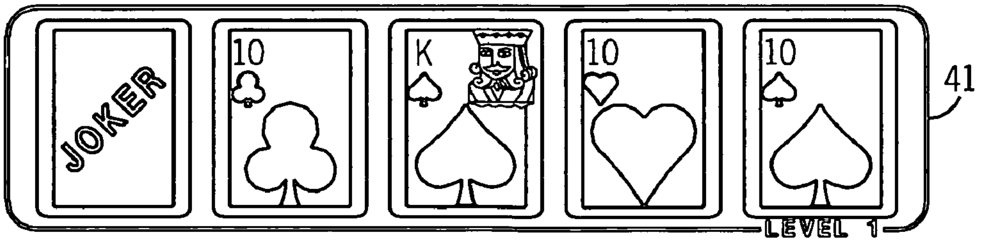

For example, as shown in FIG. 9*a*, the two of hearts wild card may alternately represent a 10 of diamonds as shown in FIG. 9*b* to create a four of a kind award, and a King as shown in FIG. 9*c* to provide a full house award. With the traditional application of wild card rules, only the highest paying award would be awarded—typically the four of a kind pay. In lieu of using a card with a rank and suit, a card such as a joker could be used to indicate a wild card as shown in FIG. 9*d*.

Figure 10A:
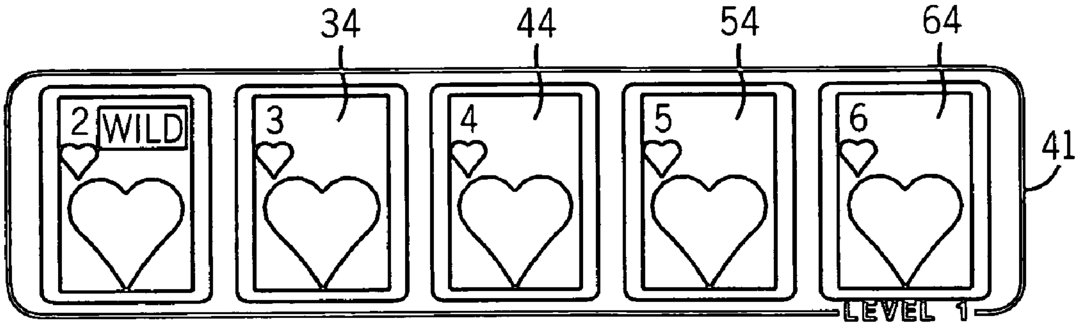
FIGS. 10*a-c* are illustrations of the use of the designated wild card's face value to create a winning symbol combination in addition to winning symbol combinations created by the wild card feature.
Figure 10B:
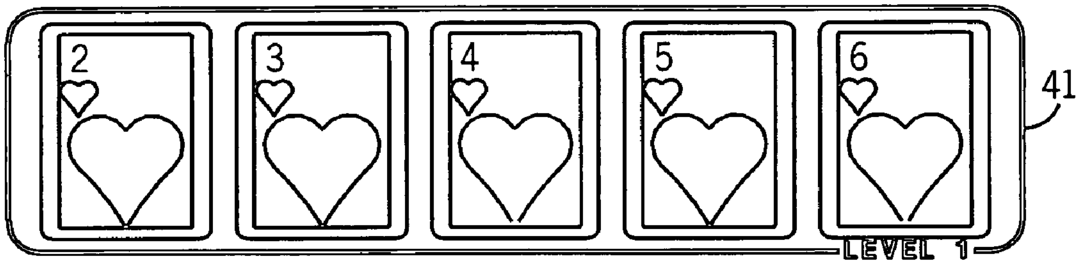
Figure 10C:
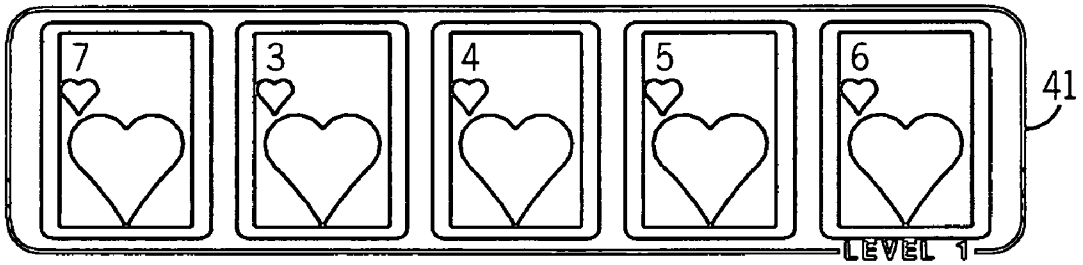

In another embodiment, as shown in FIGS. 10*a-c*, the two of hearts wild card may represent its face value, (i.e., the rank and suit of the card, in this case the two of hearts) providing a straight flush as shown in FIG. 10*b* without resorting to its wild feature function. The multi-representational wild feature may be limited to these types of situations where the face value of the wild card is sufficient to produce a winning symbol combination. Consequently, as a result, the multi-representational wild feature allows the two of hearts to become any other card to produce a different winning symbol combination. For example, the 2 of hearts may represent the 7 of hearts as shown and FIG. 10*c* to create a different winning symbol combination (albeit still a straight flush) for the same type of winning combination that may receive a second winning award. The two of hearts wild card can also represent a straight wining combination type through its representation as a seven or two of any suit other than hearts. Consequently, four different awards could be achieved with the multi-representational wild symbol.

According to traditional rules only the highest paying winning combination type is paid, as noted above, and further, no more than a single award would be paid for a winning combination type—regardless of the number of different combinations a wild symbol could potentially crate within that combination type. If desired, to limit the expected payout of the game, the multiple representational feature of the wild card may be limited to instances wherein the face value of the designated wild card is capable of producing a winning symbol combination without the wild card feature. For example the two of hearts wild card can also represent a seven of hearts to create an alternate winning symbol combination The two of hearts could also create a straight through representation as a seven of any suit other than hearts or as a to of any suit other than hearts.

If desired, to limit the number of winning card hands using multi-representational wild symbols, it may be desirable to limit awards to each type of winning symbol combination. Consequently, in the case of FIGS. 10*a-c*, the player would only when a single award for a straight flush and for a straight, rather than for two straight flushes and two straights.

To further reduce volatility and maintain a reasonable payback percentage, the pay tables may be adjusted to reflect a lower payout on winning symbol combinations that are achieved using a wild card. For example, the straight flush made with the two of hearts in FIG. 10*b* may be paid at the standard or "natural" pay table rate (i.e., without the use of a wild card to create the winning symbol combination) because the wild function was not necessary to achieve the winning symbol combination. However, the subsequent formation of the straight flush with the seven of hearts in FIG. 10*c* using the wild symbol function may only be paid at a lower rate than the standard "natural" straight flush winning symbol combination. Stated differently, a winning combination formed by using the face value of a wild card may be awarded with an enhanced award compared to the same winning combination formed by utilizing the wild card as a wild to represent a different card required to form the winning combination. For ease of reference, the use of a wild symbol to create a new winning symbol combination may be paid according to a "wild" pay or alternatively, a "natural" pay may be made for all standard winning symbol combinations not requiring a wild card (i.e., using only the face value of the wild card). An exemplary pay table for a poker type card game is provided in FIG. 12. In the pay table shown in FIG. 12, the awards shown are for winning symbol combinations requiring a wild card and winning symbol combinations not requiring a wild card.

For example, a wild card needed to form a royal flush as shown in FIG. 10*c* is paid only 200 credits in contrast to the natural flush of FIG. 10*a* which is paid at the "natural" rate of 250 credits. Thus, the natural award is an enhanced award. The pay tables may further reflect a further graduation in the payouts based on the number of wild cards needed to develop the winning symbol combination.

Figure 11:
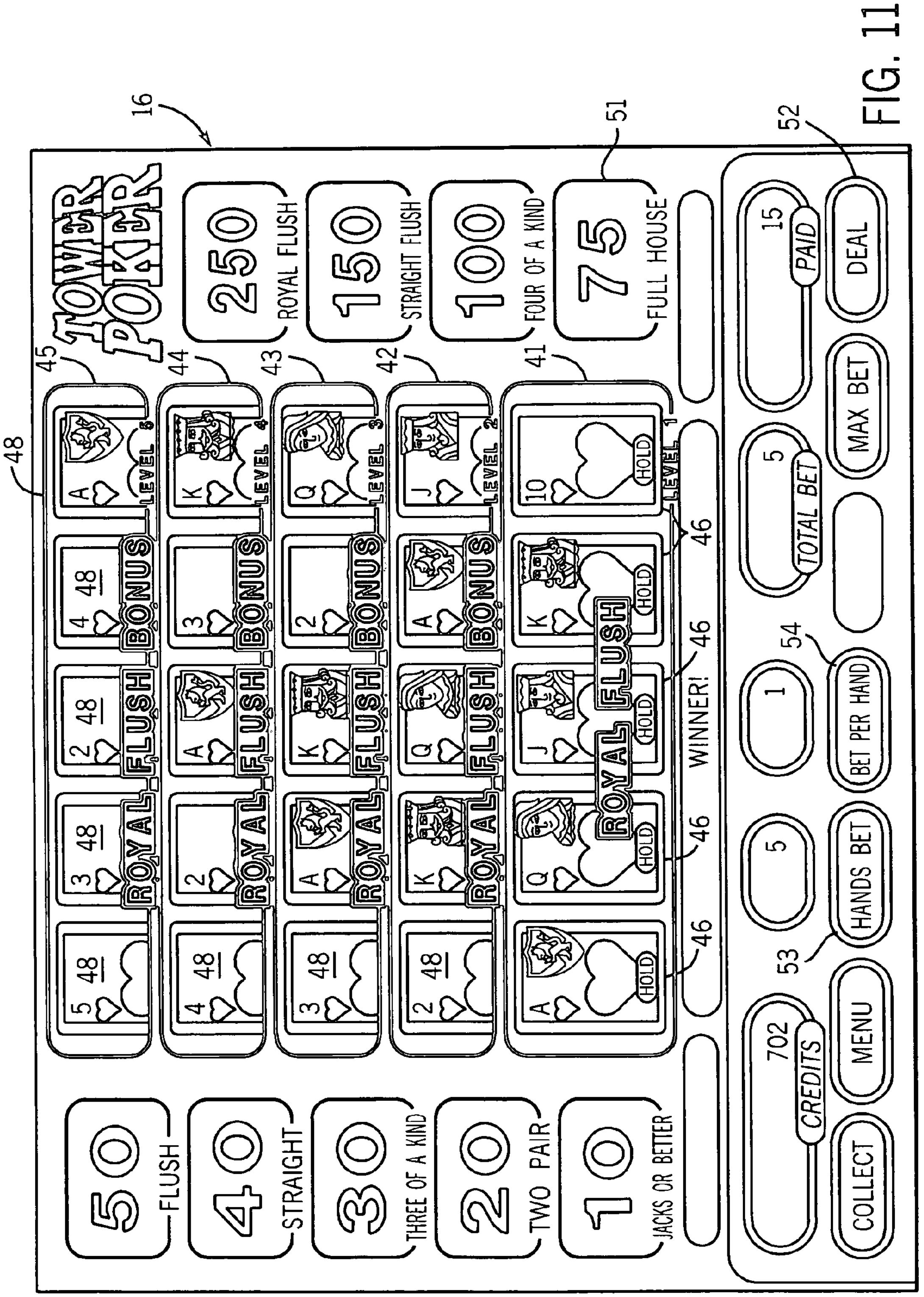
FIG. 11 is a screen display depicting the degradation of a royal flush winning card combination as the ranks escalate in subsequent card hands.

Another aspect of multiple hand card games involves the escalating rank feature and its potential for reducing the value of subsequent card hands. For example, a royal flush in the first card hand produces generates lower value card hands. As the cards are escalated, the royal flush is lost. In traditional standard multiple hand games that propagate hold cards into each of the subsequent card hands without an escalating rank feature, the escalating rank card games are at a disadvantage. Players who would have otherwise won a royal flush in each of the subsequent card hands in a traditional multi-hand card game, are reduced to a single royal flush in an escalating rank card game where all the subsequent card hands produce only a flush. An example of the degradation of the subsequent card hands after the initial Royal Flush in the first card hand a shown in FIG. 11.

Thus, to equalize the expected value of the escalating rank card games with more standard multiple hand card games, a novel pay table is sown in FIG. 12. This pay table includes bonus payments whenever the subsequent hand forms a symbol combination that pays less than the symbol combination of the hold cards from the best previous card hand. As a result, the player is guaranteed, in each of the subsequent card hands generated from the base card hand 41 a pay table award at least as favorable as the best preceding award that would have been payable on the held cards.

One way for handling this bonus payment is to award the player the Royal Flush bonus in lieu of the flush—the Royal flush bonus payment being the same as the flush payment (i.e., 250 credits). These bonus payments can be provided in the pay table as shown in FIG. 12. Therefore, in FIG. 11, in the case of the royal flush in the first card hand 41, the player is paid for a royal flush. Because all of the subsequent cards hands 42, 43, 44, 45 only produce a flush, a royal flush bonus is paid on each subsequent card hand 42, 43, 44, 45. In other words, in order to avoid a perceived penalty, for each of the subsequent towered hands, the multi-hand card game effectively awards the greater of the award for the winning combination in that hand, or the award for a winning combination in a preceding hand. This guarantees that a player receiving a royal flush, for example, in the first card hand 41 will not be penalized by the towering or propagation process described herein.

Alternately, the player could be paid for the difference between the actual winning combination in the subsequent hand (i.e., the flush worth 50 credits) and the royal flush award (250 credits) or 200 credits. For example, the gaming machine 20 may be configured to pay the player for each subsequent card hand 42, 43, 44, 45 the winning symbol combination in each of those hands 42, 43, 44, 45 according to the pay table plus any difference in that award and the award, if any, payable for the better of the symbol combination of the hold cards or propagated cards from the best previous card hand held. The winning symbol combination of each of the subsequent card hands is compared to the winning symbol combination of the held cards in the first card hand 41 or the previous best symbol combination of the propagated cards in the previous card hands to verify that the player is being paid at least as well for a winning combination in the subsequent card hand. If not, the player is paid a bonus to account for the difference.

Figure 13:
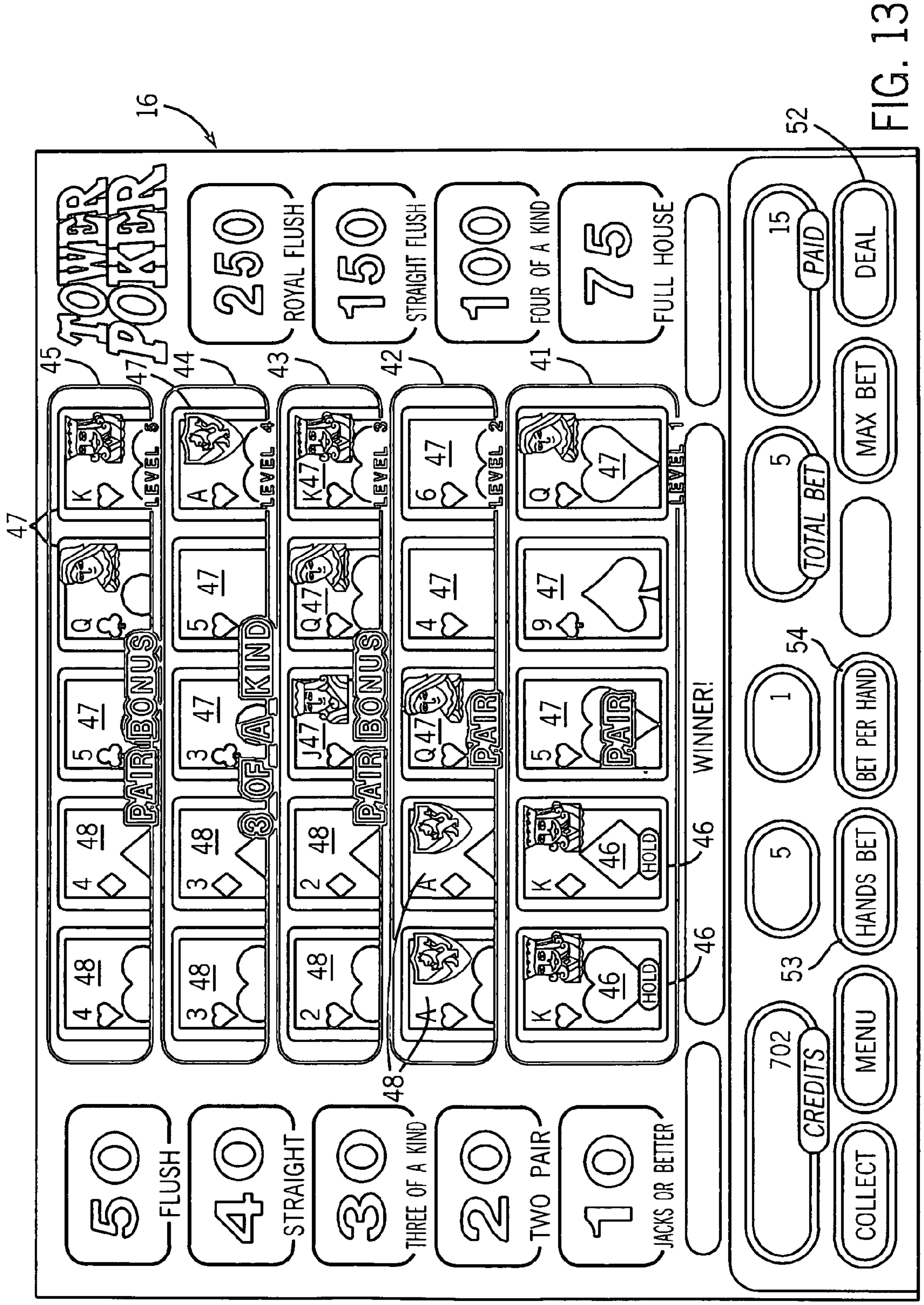
FIG. 13 is a screen display depicting the variable winning and non-winning subsequent card hands because of escalating card ranks.

Another example of this degradation in the initial card hand because of the escalation feature is shown in FIG. 13. As shown in FIG. 13 the player holds a pair of kings in the first card hand 41 to win a pair award. The held kings propagate into a pair of aces in the second card hand 42. The second card hand draws additional cards and the award for the second card hand 42 is again a pair. The subsequent three card hands will not produce a winning game outcome with the propagated cards alone—as the pay table requires a pair of jacks or better. For example, as seen in the third card hand 43, the propagated aces from the prior hand are escalated in rank to deuces and as a result, the player has drawn a losing hand.

Thus, unless, the drawn cards in each card hand, either by themselves or in combination with the propagating cards produce a winning combination, the escalation feature penalizes the player in comparison to traditional games. To ensure the escalation of the card ranks never hurts the player's subsequent card hands, a new pay table award mechanism is required. A special bonus is paid whenever a player's card hand is diminished because of the escalating ranks.

In the event, that a winning combination is not produced at least as good as the held or propagated card symbol combination is not produced, each of the subsequent card hands is issued a bonus pay—in this case a pair bonus pay. In this way, the player is never penalized for a winning game outcome created by the hold cards or the propagated cards in the previous card hand that is lost in subsequent card hands because of the escalating feature.

For example, the player has lost the potential for at least a pair award from the previous card hands due to the escalation in rank of the held cards in the third card hand 43. Consequently, the player is paid for a pair bonus pay for the third card hand 43. This bonus pair pay is the award for a standard jacks or better pay from the pay table—except that this bonus award is paid in the absence of the winning symbol combination—or for a lesser winning symbol combination. In the fourth card hand 44, although the propagated cards still do not produce a winning symbol combination, the player has drawn a card hand to produce a three of a kind winning symbol combination. Because a three of a kind pays better than a pair, the player is not entitled to a bonus award—only the award for a three of a kind. In the fifth card hand 45, the player again fails to complete a winning card hand and is paid a bonus based on the best symbol combination produced from the previous held or propagated cards—in this case a pair.

Although the above embodiments are described with respect to a group of card games commonly known as poker, it should be appreciated that the present invention is also applicable to any number of card games such as blackjack, etc., with a hierarchical or value ranked structure.

While the present invention has been described with reference to one or more particular embodiments, those skilled in the art will recognize that many changes may be made thereto without departing from the spirit and scope of the present invention. For example, the embodiments discussed may use a gaming machine which itself determines the game outcome with an onboard central processing unit. Alternately, the gaming machine may be in a network that uses a central processing unit to control and determine the game outcomes for each of the gaming machines in that network. Each of these embodiments and obvious variations thereof is contemplated as falling within the spirit and scope of the claimed invention, which is set forth in the following claims.

What is claimed is:

1. A method of playing a wagering game on a gaming system comprising at least one processor configured to execute instructions relating to the wagering game, and a gaming machine having a display and a wager input device, the method comprising:

receiving a monetary wager via the wager input device;

converting the monetary wager into an opportunity for a player to play the wagering game on the gaming system;

initiating play of the wagering game on the gaming system;

generating a random number using a random-number generator configured to output random numbers;

correlating the random number output by the random-number generator to a wagering-game outcome using the processor;

displaying a representation of the wagering game outcome on a display, the representation of the wagering-game outcome comprising a card hand formed from a group of cards in accord with the wagering game outcome, each of the cards in the group having a rank and suit;

designating in the card hand a wild card having an initially specified rank and suit;

evaluating the card hand for winning combinations, via the processor, in accord with a multi-representational wild feature wherein the wild card represents different cards that can complete a winning symbol combination;

awarding an award for each possible winning combination formed from the card hand comprising the wild card; and representing the award on the display.

2. The method of playing a wagering game on a gaming system according to claim 1, wherein the wild card may represent different cards having any rank that can complete a winning symbol combination.

3. The method of playing a wagering game on a gaming system according to claim 1, wherein the wild card may represent different cards having any suit that can complete a winning symbol combination.

4. The method of playing a wagering game on a gaming system according to claim 1, wherein the wild card may represent different cards having any rank and suit that can complete a winning symbol combination.

5. The method of playing a wagering game on a gaming system according to claim 1, wherein the act of making an award for each possible winning combination formed from the card hand comprising the wild card is limited to a single award for each type of winning symbol combination.

6. The method of playing a wagering game on a gaming system according to claim 1, wherein lower awards are awarded for winning combinations formed using the wild card as a card rank and suit different from the initially specified rank and suit and higher awards are awarded for winning combinations formed using the initially specified wild card rank and suit.

7. A method of playing a wagering game on a gaming system comprising at least one processor configured to execute instructions relating to the wagering game, and a gaming machine having a display and a wager input device, comprising:

receiving a monetary wager using the wager input device of the gaming system to initiate game play;

displaying on a display of the gaming machine a set of cards randomly selected from a group of cards by a controller associated with the gaming machine, each of the cards in the group having a rank and suit, the set of cards comprising a wild card having an initially specified rank and suit;

evaluating, using the processor, the set of cards for a first winning combination;

reevaluating, using the processor, the set of cards for another winning combination by treating the wild card in the set of cards as a card of another suit, another rank, or another suit and rank than that considered in the act of evaluating;

repeating the act of reevaluating a plurality of times, using the processor, until the occurrence of a predetermined end condition, treating the wild card in the set of cards as a card of a different suit, a different rank, or a different suit and rank than that previously considered;

awarding an award through a payoff mechanism of the gaming machine for each winning combination achieved in the acts of evaluating, reevaluating, or repeating, and displaying the award on the display of the gaming machine.

8. The method of playing a wagering game on a gaming system according to claim 7, wherein the act of repeating the act of reevaluating, using the processor, continues until the wild card has been evaluated as every card rank within the initially specified suit of the wild card.

9. The method of playing a wagering game on a gaming system according to claim 7, wherein the act of repeating the act of reevaluating, using the processor, continues until the wild card has been evaluated as every card suit within the initially specified wild card rank.

10. The method of playing a wagering game on a gaming system according to claim 7, wherein the act of repeating the act of reevaluating, using the processor, continues until the wild card has been evaluated as every card suit and every card rank.

11. The method of playing a wagering game on a gaming system according to claim 7, wherein lower awards are awarded for winning combinations formed using the wild card as a card rank and suit different from the initially specified rank and suit and higher awards are awarded for winning combinations formed using the initially specified wild card rank and suit.

12. The method of playing a wagering game on a gaming system according to claim 7, wherein the acts of reevaluating and repeating the act of reevaluating is performed only where the wild card is of a rank and suit that forms a natural winning combination from the set of cards.

13. A gaming machine comprising:

a value input device for receiving a wager;

a display for displaying a set of cards randomly selected from a group of cards, each of the cards in the group having a rank; and a controller operative to:

determine if the set of cards comprises a wild card;

evaluate the set of cards for a plurality of winning combinations in accord with a multi-representational wild feature wherein the wild card is treated as a plurality of different cards having different ranks, different suits, or different ranks and suits; and award an award for each winning combination formed from the card hand comprising the wild card.

14. The gaming machine according to claim 13, wherein the controller is operative to, in the multi-representational wild feature, treat the wild card is treated as different cards having any rank that can complete a winning symbol combination.

15. The gaming machine according to claim 13, wherein the controller is operative to, in the multi-representational wild feature, treat the wild card is treated as different cards having any suit that can complete a winning symbol combination.

16. The gaming machine according to claim 13, wherein the controller is operative to, in the multi-representational wild feature, treat the wild card is treated as different cards having any rank and suit that can complete a winning symbol combination.

17. The gaming machine according to claim 13, wherein the controller is operative to, in making an award for each winning combination formed from the card hand comprising the wild card, limit a total award to comprise a single award for each type of winning symbol combination.

18. The gaming machine according to claim 13, wherein the controller is operative to, in making an award for each winning combination formed from the card hand comprising the wild card, limit a total award to by providing lower awards for winning combinations formed using the wild card as a card rank and suit different from the initially specified rank and suit and by providing higher awards for winning combinations formed using the initially specified wild card rank and suit.

19. The gaming machine according to claim 13, wherein the controller is operative to evaluate the set of cards for a plurality of winning combinations in accord with a multi-representational wild feature only where the wild card is of a rank and suit that forms a natural winning combination from the card hand.

20. The gaming machine according to claim 13, wherein the wild card lacks a rank, a suit, or both.

* * * * *